(12) United States Patent
Shavell et al.

(10) Patent No.: US 8,266,257 B1
(45) Date of Patent: Sep. 11, 2012

(54) SYSTEMS AND METHODS FOR REDUCING THE AMOUNT OF TIME REQUIRED TO RECONNECT TO A COMPUTING NETWORK

(75) Inventors: Michael Shavell, Hudson, NH (US); Adam Schepis, Milford, MA (US); Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 54 days.

(21) Appl. No.: 12/551,751

(22) Filed: Sep. 1, 2009

(51) Int. Cl.
*G06F 15/16* (2006.01)
(52) U.S. Cl. ...... 709/220; 709/245; 370/328; 455/414.1
(58) Field of Classification Search .................. 709/220, 709/245; 370/328; 455/414.1
See application file for complete search history.

(56) References Cited

U.S. PATENT DOCUMENTS

| | | | |
|---|---|---|---|
| 7,920,510 B2 * | 4/2011 | Kim | 370/328 |
| 2004/0122974 A1 * | 6/2004 | Murakami | 709/245 |
| 2005/0080927 A1 * | 4/2005 | Anderson et al. | 709/245 |
| 2006/0155833 A1 * | 7/2006 | Matsuda et al. | 709/220 |
| 2007/0264979 A1 * | 11/2007 | Park et al. | 455/414.1 |

* cited by examiner

*Primary Examiner* — Kyung H Shin
(74) *Attorney, Agent, or Firm* — Advantedge Law Group

(57) ABSTRACT

As will be described in greater detail below, the instant disclosure generally relates to systems and methods for reducing the amount of time required to reconnect to a computing network. In one example, an exemplary method for accomplishing this task may include: 1) initiating a DHCP request for an IP address and then, while waiting for the DHCP request to resolve, 2) identifying a prior IP address previously used by the computing device to access the computing network, 3) probing the computing network to ensure that the prior IP address is not currently in use by other devices within the computing network, and 4) accessing the computing network using the prior IP address. Corresponding systems and computer-readable media are also disclosed.

18 Claims, 6 Drawing Sheets

Database Entry
122(1)

```
------------------------------------------------------------
************************************************
Network ID: 00-B0-3D-A2-2D-1C
************************************************

************************************************
IPv4 Address(es):
198.161.1.22 (8/08/2009)
198.161.1.7 (7/02/2009)
198.161.1.13 (5/01/2009)
************************************************
************************************************
IPv6 Address(es):
fe75::fa42::42c1:9980:16ae%24 (8/08/2009)
fe75::fa42::42c1:9980:14bc%24 (7/02/2000)
************************************************
************************************************
Subnet Mask:
255.255.255.0
************************************************
************************************************
Default Gateway:
198.167.1.1
************************************************
------------------------------------------------------------
```

IP Addresses 124(1) { (bracketing IPv4 and IPv6 sections)

FIG. 4

SYSTEMS AND METHODS FOR REDUCING THE AMOUNT OF TIME REQUIRED TO RECONNECT TO A COMPUTING NETWORK

BACKGROUND

In many networked computing environments, a user's computing device must wait for a dynamic host configuration protocol (DHCP) server to provide an IP address before the user's computing device can access the network. In some networks, the negotiation process required to obtain an IP address may take several minutes to complete, effectively delaying the user from accessing email, online applications, and other network resources.

Due to the increasing popularity of mobile devices, a large majority of which frequently hop from network to network during transport, the effect of such delays may be compounded over time, leading to user frustration. As such, the instant disclosure identifies a need for systems and methods for reducing the amount of time required to reconnect to a computing network.

SUMMARY

As will be described in greater detail below, the instant disclosure generally relates to systems and methods for reducing the amount of time required to reconnect to a computing network. In one example, a computing device may accomplish this task by: 1) initiating a DHCP request for an IP address, and then, while waiting for the DHCP request to resolve, 2) identifying a prior IP address previously used to access the network (such as the most-recent IP address used by the computing device to access the network), 3) accessing the network using the prior IP address, and 4) probing the network to ensure that the prior IP address is not currently in use by other devices within the network. In at least one example, these steps may be implemented via a low-level driver or early startup item.

In some examples, the computing device may identify a prior IP address previously used to access the network by: 1) identifying, within a database entry associated with the network, a prior IP address previously used to access the network and then 2) retrieving the prior IP address from the database entry. In this example, the database may contain at least one database entry for each network accessed by the computing device. In some examples, each network accessed by the computing device may be identified by a unique identifier (such as a MAC address) assigned to a networking device (such as a router, switch, or wireless access point) associated with, or that provides access to, the network.

At some later point in time, the computing device may receive an IP-address assignment from a DHCP server in response to the initiated DHCP request. Upon receiving this IP-address assignment, the computing device may determine whether the IP-address assignment is different from the prior IP address used to access the network. If the IP-address assignment is the same as the prior IP address used to access the network, then the computing device may maintain connection with the network using the prior IP address. If, however, the IP-address assignment is different from the prior IP address used to access the network, then the computing device may: 1) reconnect to the network using the new IP address and then 2) store this new IP address in a database entry associated with the network.

In one example, the computing device may immediately migrate short-lived connections (such as Internet connections) created using the prior IP address to the new IP address since these connections may only last a short period of time and may be recreated as needed. Alternatively, the computing device may delay migrating longer-lasting connections (such as VPN connections) to the new IP address until these connections terminate in order to prevent service interruptions. The computing device may also prevent such longer-lasting connections from being established prior to resolution of the DHCP request in order to prevent service interruptions.

By enabling computing devices to reconnect to networks using previously assigned IP addresses, the systems and methods described herein may significantly reduce the amount of time required to reconnect to networks. In addition, by probing a network to determine whether a previously assigned IP address is currently in use by other devices within the network, these systems and methods may improve reconnection performance without introducing IP conflicts.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a block diagram of an exemplary database entry associated with a computing network previously accessed by a computing device.

Figure 1:
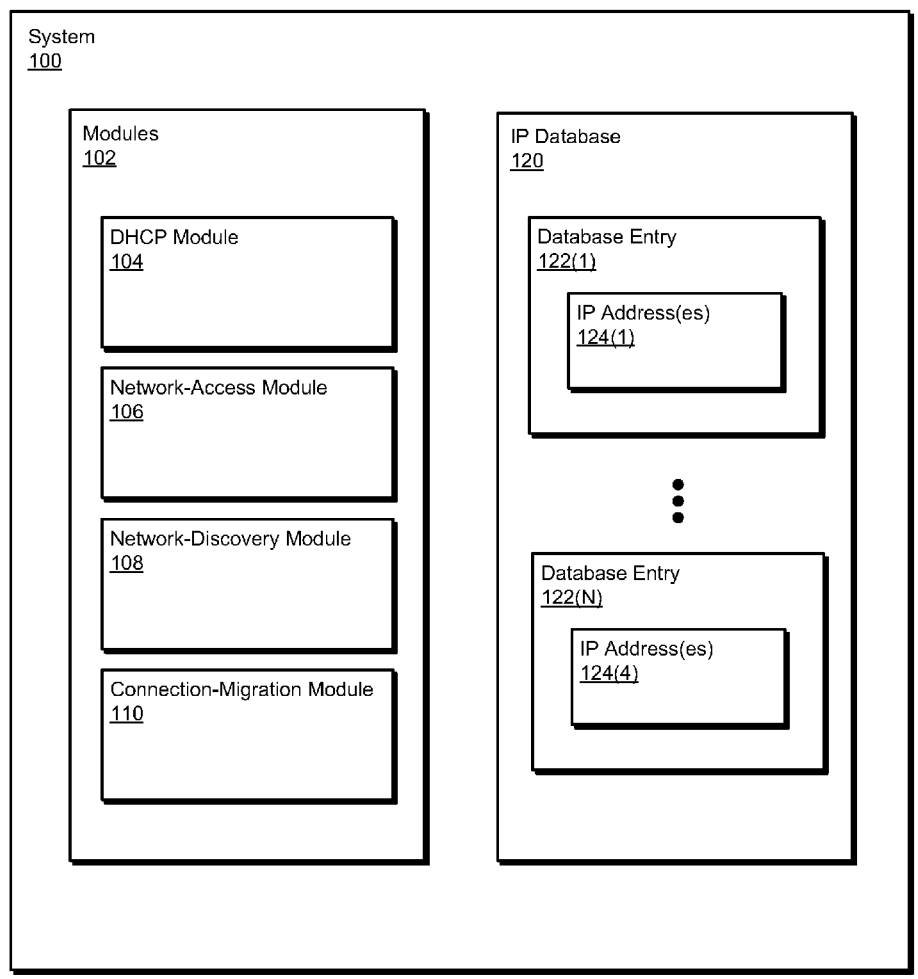
FIG. 1 is a block diagram of an exemplary system for reducing the amount of time required to reconnect to a computing network.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for reducing the amount of time required to reconnect to a computing network. In one example, a method for accomplishing this task may include: 1) initiating a DHCP request for an IP address, and then, while waiting for the DHCP request to resolve, 2) identifying a prior IP address previously used to access the network (such as the most-recent IP address used by the computing device to access the network), 3) accessing the network using the prior IP address, and 4) probing the network to ensure that the prior IP address is not currently in use by other devices within the network.

Figure 2:
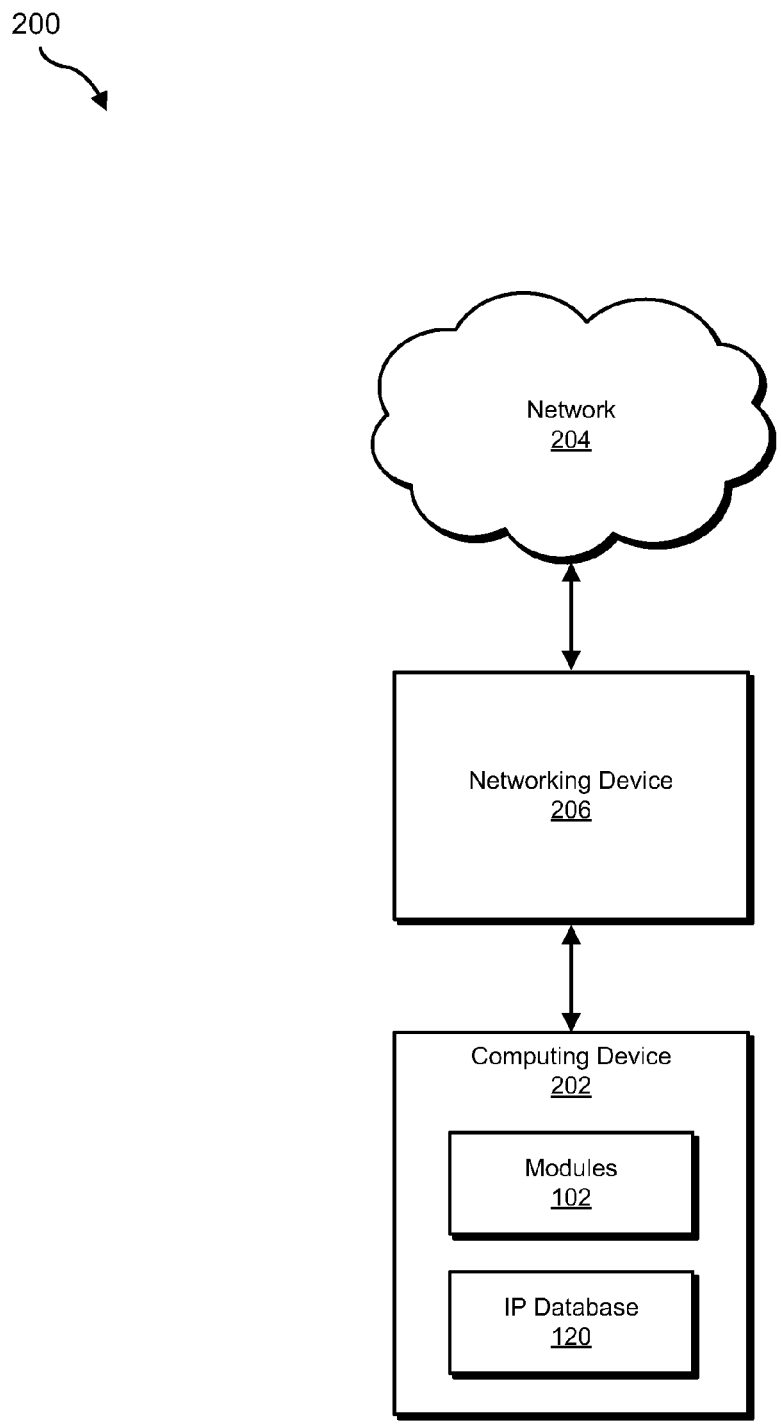
FIG. 2 is a block diagram of an exemplary system for reducing the amount of time required to reconnect to a computing network.

The following will provide, with reference to FIGS. 1-2, detailed descriptions of exemplary systems for reducing the amount of time required to reconnect to a computing network. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

As used herein, the term "computing network" may refer to any medium or architecture capable of facilitating communication or data transfer. Examples of such networks include, without limitation, an intranet, a wide area network (WAN), a local area network (LAN), a personal area network (PAN), the Internet, power line communications (PLC), a cellular network (e.g., a GSM Network), or the like.

In addition, the term "IP address" may refer to any of a variety forms of IP addresses, including, for example, IPv4 addresses, IPv6 addresses, and the like. Similarly, the term "DHCP" may refer to any configuration protocol used to provide or assign IP addresses and related configuration information.

FIG. 1 is a block diagram of an exemplary system 100 for reducing the amount of time required to reconnect to a computing network, As illustrated in this figure, exemplary system 100 may include one or more modules 102 for performing one or more tasks. For example, and as will be explained in greater detail below, exemplary system 100 may include a DCHP module 104 programmed to initiate and manage DHCP requests for IP addresses. Exemplary system 100 may also include a network-access module 106 programmed to identify and use prior a IP address to access a network prior to resolution of a DHCP request.

In addition, and as will be described in greater detail below, exemplary system 100 may include a network-discovery module 108 programmed to probe computing networks to ensure that previously assigned IP addresses are not currently in use by other devices. In cases where a new IP-address assignment received from a DHCP server differs from a prior IP address used to access a network, exemplary system 100 may also include a connection-migration module 110 programmed to migrate connections from the prior IP address to the new IP address. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include an IP database 120. IP database 120 may represent portions of a single database or computing device or a plurality of databases or computing devices. In one embodiment, IP database 120 may contain a plurality of database entries 122 (1)-(N) containing IP addresses previously used when connecting to computer networks, as will be described in greater detail below.

IP database 120 in FIG. 1 may represent a portion of one or more computing devices. For example, IP database 120 may represent a portion of computing device 202 in FIG. 2, computing system 510 in FIG. 5, and/or portions of exemplary network architecture 600 in FIG. 6. Alternatively, IP database 120 may represent one or more physically separate devices capable of being accessed by a computing device, such as computing device 202 in FIG. 2, computing system 510 in FIG. 5, and/or portions of exemplary network architecture 600 in FIG. 6.

The various systems and methods described herein may be deployed in a variety of ways. For example, all or a portion of exemplary system 100 in FIG. 1 may represent portions of exemplary system 200 in FIG. 2. As shown in FIG. 2, system 200 may include a computing device 202 in communication with a network 204 via a networking device 206. In one embodiment, and as will be described in greater detail below, computing device 202 may access network 204 by: 1) initiating (via, e.g., networking device 206) a DHCP request for an IP address, and then, while waiting for the DHCP request to resolve, 2) identifying a prior IP address previously used by computing device 202 to access network 204, 3) accessing network 204 using the prior IP address, and 4) probing network 204 to ensure that the prior IP address is not currently in use by other devices within network 204.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections.

Networking device 206 generally represents any type or form of device capable of facilitating access to a network, such as network 204. Examples of networking device 206 include, without limitation, routers, switches, gateways, and wireless access points.

Figure 3:
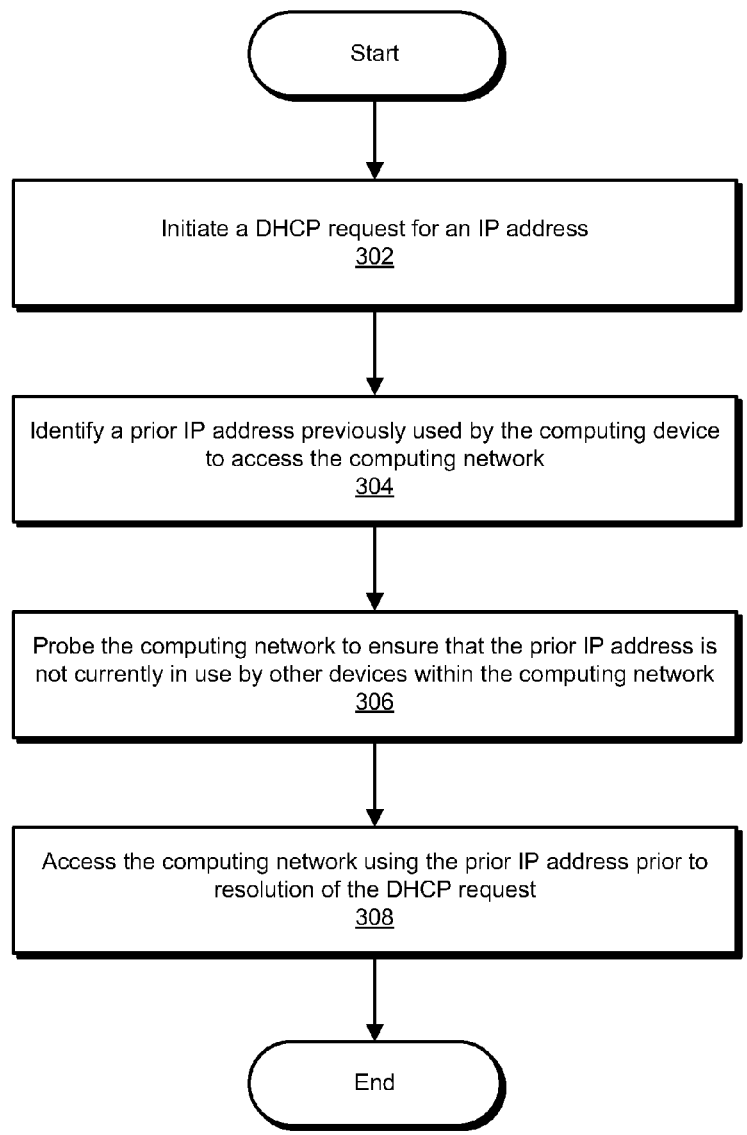
FIG. 3 is a flow diagram of an exemplary method for reducing the amount of time required to reconnect to a computing network.

FIG. 3 is a flow diagram of an exemplary computer-implemented method 300 for reducing the amount of time required to reconnect to a computing network. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the various systems described herein may attempt to access a computing network by initiating a DHCP request for an IP address. For example, DHCP module 104 in FIG. 1 (which may, as detailed above, represent a portion of computing device 202 in FIG. 2) may attempt to access network 204 by initiating a DHCP request for an IP address.

DHCP module 104 may initiate a DHCP request for an IP address in a variety of ways, including via conventional methods known in the art. For example, DHCP module 104 may initiate a DHCP request for an IP address by broadcasting a "DHCPDiscover" packet.

Returning to FIG. 3, at step 304 the various systems described herein may, while waiting for the DHCP request initiated in step 302 to resolve, identify a prior IP address previously used to access the computing network. For example, network-access module 106 in FIG. 1 (which may, as detailed above, represent a portion of computing device 202 in FIG. 2) may identify a prior IP address previously used by computing device 202 to access network 204.

Network-access module 106 may perform step 304 in a variety of ways. In one example, network-access module 106 may identify a prior IP address previously used by a computing device to access a computing network by: 1) uniquely identifying the computing network, 2) identifying, within a database entry associated with the computing network, an IP address associated with the computing network, and then 3) retrieving the IP address associated with the computing network from the database entry.

For example, network-access module 106 may identify a prior IP address previously used by computing device 202 to access network 204 by: 1) uniquely identifying network 204 (as explained below), 2) identifying, within a database entry (e.g., database entry 122(1) in FIG. 1) associated with network 204, an IP address (e.g., IP address 124(1) in FIG. 1) associated with network 204, and then 3) retrieving IP address 124(1) from database entry 122(1) in IP database 120 in FIG. 1. As detailed above, IP database 120 may contain at least one database entry (e.g., database entries 122(1)-(N)) for each computing network accessed by computing device 202. For example, as illustrated in FIG. 4, a database entry 122(1) may contain information that identifies one or more prior IP addresses 124(1) previously used by computing device 202 to access network 204.

Network-access module 106 may uniquely identify computing networks in a variety of ways. In one example, network-access module 106 may uniquely identify a computing network by: 1) identifying a network device that is associated with the computing network and then 2) identifying a unique identifier that is associated with the networking device. For example, networking-access module 106 in FIG. 1 may: 1) identify networking device 206 in FIG. 2 (which may, as detailed above, represent a router, switch, or wireless access point for accessing network 204) and then 2) identify a unique identifier (such as a MAC address) associated with networking device 206.

Upon uniquely identifying network 204, network-access module 106 may search IP database 122 for a database entry that is associated with network 204. For example, network-access module 106 may determine that database entry 122(1) in FIG. 4 is associated with network 204 since the MAC address of networking device 206 (in this example, "00-B0-3D-A2-2D-1C") is identical to a network identifier ("Network ID: 00-B0-3D-A2-2D-1C") contained in database entry 122(1).

Upon determining that database entry 122(1) is associated with network 204, network-access module 106 may retrieve, from database entry 122(1), an IP address that was previously used by computing device 202 to access network 204. In one example, network-access module 106 may retrieve the most-recent IP address used by computing device 202 to access network 204. For example, network-access module 106 may retrieve the IPv4 address "198.161.1.22" or the IPv6 address "fe75::fa42::42c1:9980:16ae%24" from database 122(1) since these addresses represent the most-recent IP addresses used by computing device 202 to access network 204. As detailed above, IP addresses 124(1) may represent any of a variety forms of IP addresses, including, for example, IPv4 addresses, IPv6 addresses, and the like.

In some examples, database entries 122(1)-122(N) may contain additional information for identifying or accessing networks. For example, as illustrated in FIG. 4, database entry 122(1) may contain information that identifies a subnet mask associated with network 204 (in this example, "255.255.255.0"), information that identifies a default gateway associated with network 204 (in this example, "198.167.1.1"), or any other useful information.

Returning to FIG. 3, at step 306 the various systems described herein may probe the computing network to ensure that the prior IP address identified in step 304 is not currently in use by other devices within the computing network. For example, network-discovery module 108 in FIG. 1 (which may, as detailed above, represent a portion of computing device 202 in FIG. 2) may cause computing device 202 to probe network 204 to ensure that the prior IP address retrieved from database entry 122(1) is not currently in use by other devices within network 204.

Network-discovery module 108 may perform step 306 in a variety of ways. For example, network-discovery module 108 may probe network 204 using an Internet Control Management Protocol (ICMP), an address resolution protocol (ARP), or the like. In some examples, network-discovery module 108 may prevent computing device 202 from responding to any requests initiated via such probes.

Returning to FIG. 3, at step 308 the systems described herein may access the computing network using the prior IP address identified in step 304. For example, network-access module 106 from FIG. 1 may cause computing device 202 to access network 204 in FIG. 2 using the prior IP address retrieved from database entry 122(1) in FIG. 4. Upon completion of step 308, exemplary method 300 in FIG. 3 may terminate.

While the steps illustrated and/or described in FIG. 3 may be shown or discussed in a particular order, these steps do not necessarily need to be performed in the order illustrated or discussed. For example, in some embodiments step 308 in FIG. 3 may be performed prior to, and apart from, step 306. For example, step 306 may be implemented via a low-level thread initiated after completion of step 308.

As detailed above, computing device 202 may access network 204 using the prior IP address identified in step 304 until the DHCP request initiated in step 302 resolves. In one example, DHCP module 104 (which may, as detailed above, represent a portion of computing device 202 in FIG. 2) may at some later point receive, in response to the DHCP request initiated in step 302, an IP-address assignment from the DHCP server. In some examples, DHCP module 104 may receive this IP-address assignment via networking device 206. Upon receiving this IP-address assignment, DHCP module 104 may determine whether the IP-address assignment is different from the prior IP address identified in step 304. If the IP-address assignment is the same as the prior IP address identified in step 304, then DHCP module 104 may instruct network-access module 106 to maintain connection with network 204 using the prior IP address.

Alternatively, if DHCP module 104 determines that the IP-address assignment received from the DHCP server is different from the prior IP address identified at step 304, then DHCP module 104 may instruct connection-migration module 110 (which may, as detailed above, represent a portion of computing device 202 in FIG. 2) to reconnect to network 204 using the newly received IP-address assignment. Upon determining that the IP-address assignment is different from the prior IP address, DHCP module 104 may then store this IP-address assignment in IP database 120 in FIG. 1 (e.g., in database entry 122(1)).

Connection-migration module 110 may reconnect to network 204 using the new IP-address assignment received from the DHCP server in a variety of ways. In one example, connection-migration module 110 may immediately migrate short-lived connections (such as Internet connections) created using the prior IP address to the new IP address since these connections only last a short period of time and can be recreated as needed. Alternatively, connection-migration module 110 may delay migrating longer-lasting connections (such as VPN connections) to the new IP address until these connections terminate in order to prevent service interruptions.

In some embodiments, network-access module 106 may prevent such longer-lasting connections from being established prior to resolution of the DHCP request initiated in step 302 in order to prevent service interruptions. In one example, network-access module 106 may accomplish this task by: 1) identifying at least one process (such as an application, service, or the like) on computing device 202 that requires access to network 204, 2) estimating a connection length required by the process, and then 3) determining, based on the connection length required by the process, whether to allow the process to access network 204 prior to resolution of the DHCP request initiated at step 302. For example, network-access module 106 may prevent a VPN connection from accessing network 204 prior to resolution of the DHCP request initiated in step 302 in order to prevent service interruptions that may be caused by switching from the prior IP address to a new IP address assigned by a DHCP server.

In some examples, network-access module 106 may determine, upon uniquely identifying a network in connection with step 304, that IP addresses assigned to access this network frequently change. For example, network-access module 106 may determine, by analyzing a database entry within IP database 120 in FIG. 1 that is associated with a network, that computing device 202 in FIG. 2 has used 12 different IP addresses to access this network within the last two weeks. In this example, network-access module 106 may refrain from accessing the network using one of these prior IP addresses to avoid potential conflicts and/or connection issues, and may instead wait for the DHCP request initiated in step 302 to resolve.

In some examples, exemplary method 300 in FIG. 3 may be implemented via a low-level driver or early startup item. In this example, exemplary method 300 may enable computing device 202 to access network 204 during startup or before a user uses computing device 202 in order to eliminate introducing delays.

By enabling computing devices to reconnect to networks using previously assigned IP addresses, the systems and methods described herein may significantly reduce the amount of time required to reconnect to networks. In addition, by probing a network to determine whether a previously assigned IP address is currently in use by other devices within the network, these systems and methods may improve reconnection performance without introducing IP conflicts.

Figure 5:
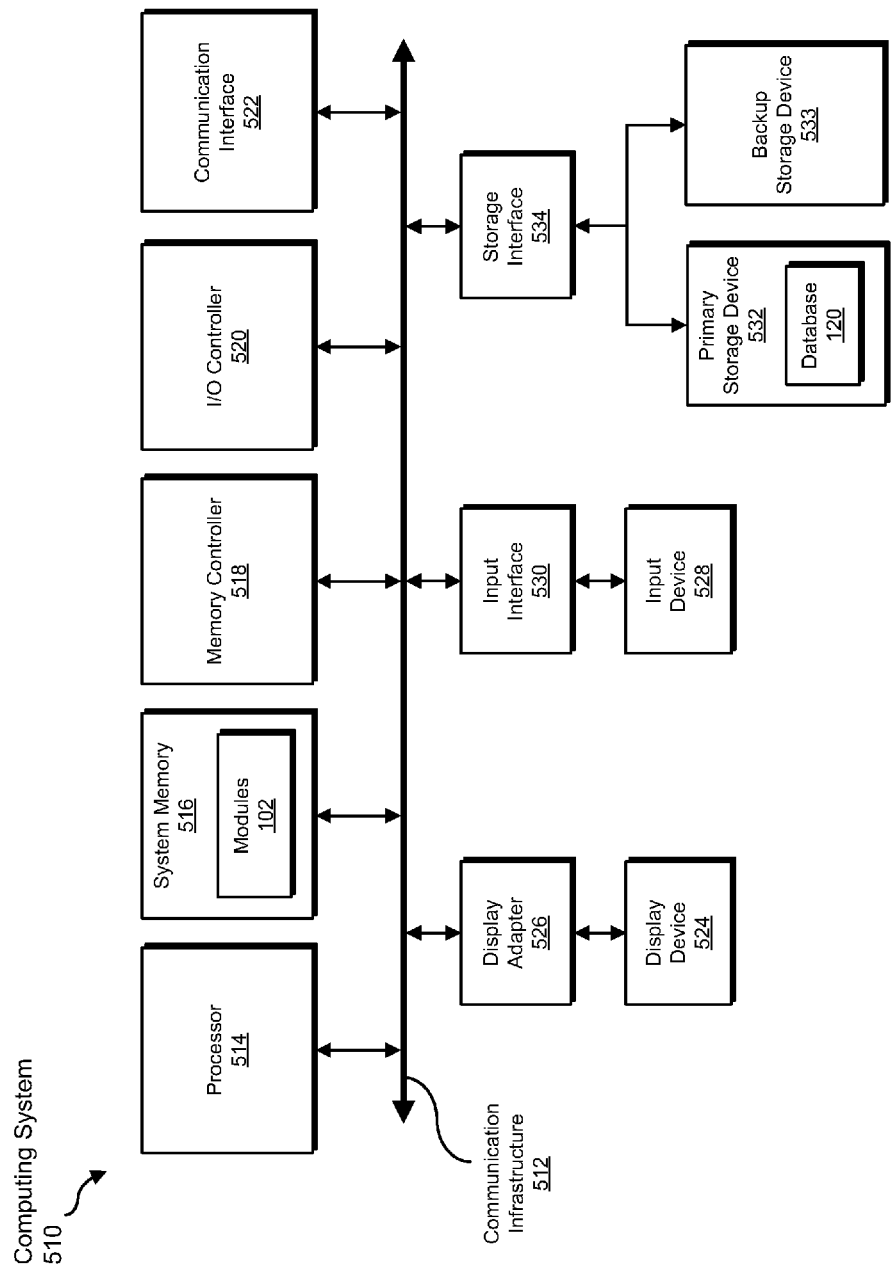
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the initiating, identifying, probing, accessing, receiving, determining, connecting, reconnecting, storing, maintaining, and estimating steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as initiating, identifying, probing, accessing, receiving, determining, connecting, reconnecting, storing, maintaining, and estimating.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the initiating, identifying, probing, accessing, receiving, determining, connecting, reconnecting, storing, maintaining, and estimating steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 594 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the initiating, identifying, probing, accessing, receiving, determining, connecting, reconnecting, storing, maintaining, and estimating steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the initiating, identifying, probing, accessing, receiving, determining, connecting, reconnecting, storing, maintaining, and estimating steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, IP database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the initiating, identifying, probing, accessing, receiving, determining, connecting, reconnecting, storing, maintaining, and estimating steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
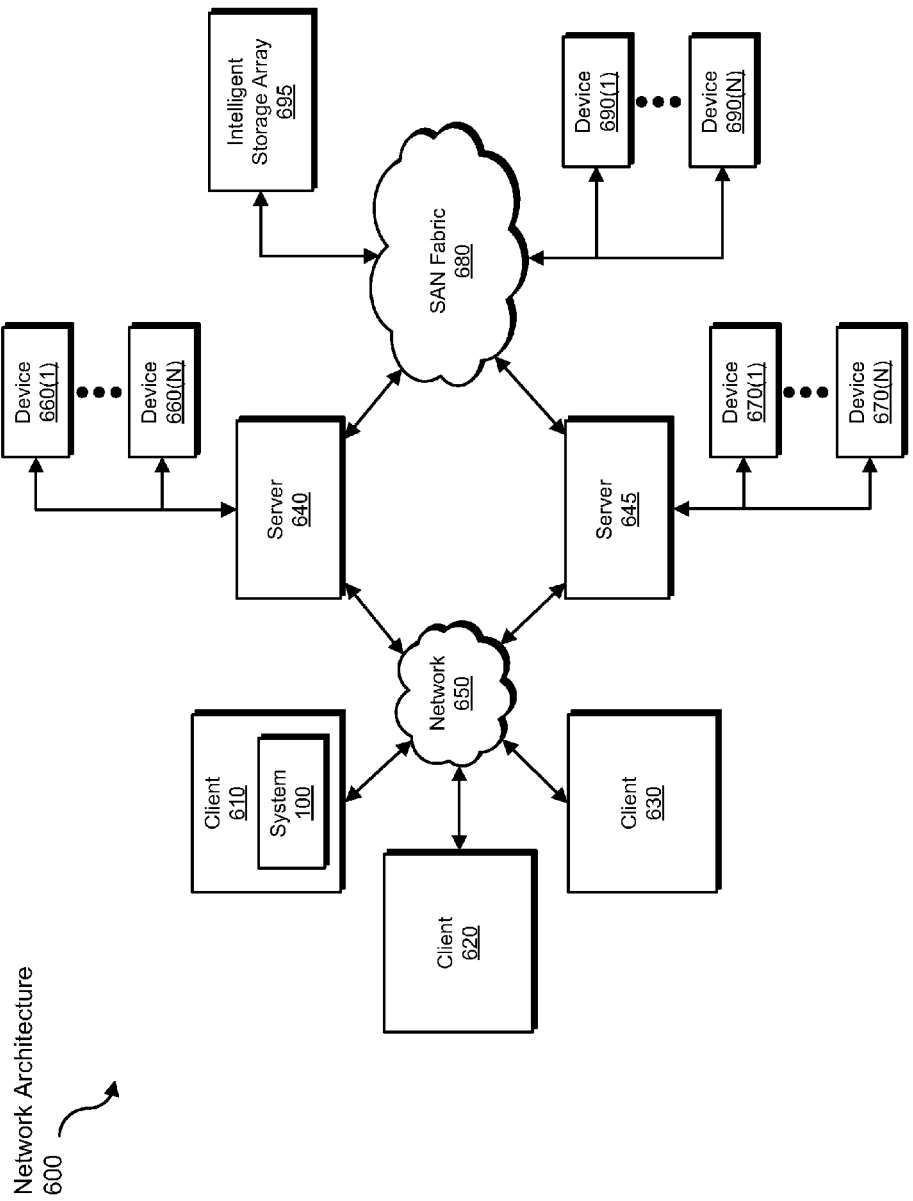
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the initiating, identifying, probing, accessing, receiving, determining, connecting, reconnecting, storing, maintaining, and estimating steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for reducing the amount of time required to reconnect to a computing network. In one example, such a method may include: 1) initiating a DHCP request for an IP address and then, while waiting for the DHCP request to resolve, 2) identifying a prior IP address previously used by the computing device to access the computing network, 3) probing the computing network to ensure that the prior IP address is not currently in use by other devices within the computing network, and 4) accessing the computing network using the prior IP address. In at least one example, this method may be implemented via a low-level driver or early startup item.

In some examples, identifying the prior IP address previously used by the computing device to access the computing network may include: 1) identifying the computing network, 2) identifying, within a database, a database entry associated with the computing network, the database entry containing the prior IP address, and then 3) retrieving the prior IP address from the database entry. In this example, the database may contain at least one database entry for each computing network accessed by the computing device.

In one example, identifying the computing network may include: 1) identifying a networking device associated with the computing network and then 2) identifying a unique identifier associated with the networking device. In this example, the unique identifier may include a MAC address and the networking device may include a router, a switch, a gateway, a wireless access point, or the like.

In some examples, the method may also include: 1) receiving, in response to the DHCP request, an IP-address assignment from a DHCP server, 2) determining that the IP-address assignment is different from the prior IP address, and then 3) reconnecting to the computing network using the IP-address assignment. In this example, the method may also include storing the IP-address assignment in a database.

In at least one example, the method may also include: 1) receiving, in response to the DHCP request, an IP-address assignment from a DHCP server, 2) determining that the IP-address assignment is the same as the prior IP address, and then 3) maintaining connection with the computing network using the prior IP address.

The method may also include: 1) identifying at least one process on the computing device that requires access to the computing network, 2) estimating a connection length required by the process, and then 3) determining, based on the connection length required by the process, whether to allow the process to access the computing network prior to resolution of the DHCP request.

In some examples, probing the computing network may include probing the computing network using an Internet control management protocol, an address resolution protocol, or the like. In addition, the prior IP address may represent the most-recent IP address used by the computing device to access the computing network.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The various systems and methods described herein may be deployed in a variety of ways. For example, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. In particular, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, DHCP module 104 in FIG. 1 may transform a property or characteristic of IP database 120 by storing or modifying IP addresses in database entries 122(1)-(N) within IP database 120.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for reducing the amount of time required to reconnect to a computing network, the method comprising:
   initiating, at a computing device comprising at least one processor, a DHCP request to obtain an IP address from a DHCP server;
   while waiting for the DHCP server to resolve the DHCP request:
      identifying a prior IP address previously used by the computing device to access the computing network;
      probing the computing network to ensure that the prior IP address is not currently in use by other devices within the computing network;
      using the prior IP address to reconnect to the same computing network prior to receiving a response to the DHCP request from the DHCP server in order to reduce the amount of time required to reconnect to the computing network;
   identifying at least one process on the computing device that requires access to the computing network;
   estimating a connection length required by the process;
   determining, based on the connection length required by the process, whether to allow the process to access the computing network prior to resolution of the DHCP request.

2. The method of claim 1, wherein identifying the prior IP address previously used by the computing device to access the computing network comprises:
   identifying the computing network;
   identifying, within a database, a database entry associated with the computing network, the database entry containing the prior IP address;
   retrieving the prior IP address from the database entry.

3. The method of claim 2, wherein the database contains at least one database entry for each computing network accessed by the computing device.

4. The method of claim 2, wherein identifying the computing network comprises:
   identifying a networking device associated with the computing network;
   identifying a unique identifier associated with the networking device.

5. The method of claim 4, wherein the unique identifier comprises a MAC address and the networking device comprises:
a router;
a switch;
a gateway;
a wireless access point.

6. The method of claim 1, further comprising:
receiving, in response to the DHCP request, an IP-address assignment from the DHCP server;
determining that the IP-address assignment is different from the prior IP address;
reconnecting to the computing network using the IP-address assignment.

7. The method of claim 6, further comprising storing the IP-address assignment in a database.

8. The method of claim 1, further comprising:
receiving, in response to the DHCP request, an IP-address assignment from the DHCP server;
determining that the IP-address assignment is the same as the prior IP address;
maintaining connection with the computing network using the prior IP address.

9. The method of claim 1, wherein probing the computing network comprises probing the computing network using at least one of:
an Internet control management protocol;
an address resolution protocol.

10. The method of claim 1, wherein the prior IP address comprises the most-recent IP address used by the computing device to access the computing network.

11. The method of claim 1, wherein the method is implemented via a low-level driver or early startup item.

12. A system for reducing the amount of time required for a computing device to reconnect to a computing network, the system comprising:
a DHCP module programmed to initiate a DCHP request to obtain an IP address from a DHCP server;
a network-access module programmed to, while waiting for the DHCP server to resolve the DHCP request:
identify a prior IP address previously used by the computing device to access the computing network;
use the prior IP address to reconnect to the same computing network prior to receiving a response to the DHCP request from DHCP server in order to reduce the amount of time required to reconnect to the computing network;
a network-discovery module programmed to probe the computing network to ensure that the prior IP address is not currently in use by other devices within the computing network;
wherein the network-access module is further programmed to:
identify at least one process on the computing device that requires access to the computing network;
estimate a connection length required by the process;
determine, based on the connection length required by the process, whether to allow the process to access the computing network prior to resolution of the DHCP request;
at least one memory device configured to store the DHCP module, the network-access module, and the network-discovery module;
at least one processor configured to execute the DHCP module, the network-access module, and the network-discovery module.

13. The system of claim 12, wherein the network-access module identifies the prior IP address previously used by the computing device to access the computing network by:
identifying the computing network;
identifying, within a database, a database entry associated with the computing network, the database entry containing the prior IP address;
retrieving the prior IP address from the database entry.

14. The system of claim 13, wherein the network-access module identifies the computing network by:
identifying a networking device associated with the computing network;
identifying a unique identifier associated with the networking device.

15. The system of claim 12, wherein the DHCP module is further programmed to:
receive, in response to the DHCP request, an IP-address assignment from the DHCP server;
determine that the IP-address assignment is different from the prior IP address;
and the system further comprises a connection-migration module programmed to reconnect to the computing network using the IP-address assignment.

16. The system of claim 15, wherein the DHCP module is further programmed to store the IP-address assignment in a database.

17. The system of claim 12, wherein:
the DHCP module is further programmed to:
receive, in response to the DHCP request, an IP-address assignment from the DHCP server;
determine that the IP-address assignment is the same as the prior IP address;
the network-access module is further programmed to maintain connection with the computing network using the prior IP address.

18. A computer-readable memory comprising computer-executable instructions that, when executed by at least one processor of a computing device, cause the computing device to:
initiate a DHCP request to obtain an IP address from a DHCP server;
while waiting for the DHCP server to resolve the DHCP request:
identify a prior IP address previously used by the computing device to access a computing network;
probe the computing network to ensure that the prior IP address is not currently in use by other devices within the computing network;
use the prior IP address to reconnect to the same computing network prior to receiving a response to the DHCP request from the DHCP server in order to reduce the amount of time required to reconnect to the computing network;
identify at least one process on the computing device that requires access to the computing network;
estimate a connection length required by the process;
determine, based on the connection length required by the process, whether to allow the process to access the computing network prior to resolution of the DHCP request.

* * * * *